United States Patent
Dierickx et al.

(10) Patent No.: US 10,005,250 B2
(45) Date of Patent: Jun. 26, 2018

(54) INJECTION MOLDING APPARATUS FOR MANUFACTURING HOLLOW OBJECTS, IN PARTICULAR PLASTIC PREFORMS, RESP. CONTAINERS AND METHOD THEREFOR

(75) Inventors: William Dierickx, Destelbergen (BE); Dirk De Cuyper, Destelbergen (BE)

(73) Assignee: Resilux, Wetteren (BE)

( * ) Notice: Subject to any disclaimer, the term of this patent is extended or adjusted under 35 U.S.C. 154(b) by 0 days. days.

(21) Appl. No.: 13/983,724

(22) PCT Filed: Feb. 1, 2012

(86) PCT No.: PCT/BE2012/000008
§ 371 (c)(1),
(2), (4) Date: Aug. 5, 2013

(87) PCT Pub. No.: WO2012/103604
PCT Pub. Date: Aug. 9, 2012

(65) Prior Publication Data
US 2013/0313751 A1   Nov. 28, 2013

(30) Foreign Application Priority Data
Feb. 3, 2011  (BE) .................................. 2011/0068

(51) Int. Cl.
*B29C 45/16*   (2006.01)
*B29D 22/00*   (2006.01)
(Continued)

(52) U.S. Cl.
CPC .......... *B29D 22/00* (2013.01); *B29C 45/1603* (2013.01); *B29C 45/27* (2013.01); *B29C 45/2806* (2013.01); *B29C 2045/2775* (2013.01)

(58) Field of Classification Search
CPC ........ B29C 45/2806; B29C 2045/2775; B29C 45/1603; B29C 45/1604; B29C 45/1607;
(Continued)

(56) References Cited

U.S. PATENT DOCUMENTS 5,268,184 A * 12/1993 Gellert .................... B29C 45/27
264/328.15
5,582,851 A * 12/1996 Hofstetter ........... B29C 45/1603
425/562
(Continued)

FOREIGN PATENT DOCUMENTS

EP    0995573 A1    4/2000
EP    0995574 A1    4/2000
(Continued)

OTHER PUBLICATIONS

Electronic translation of JP 2002-361691.*

*Primary Examiner* — Jill L Heitbrink
(74) *Attorney, Agent, or Firm* — James Creighton Wray; Meera P. Narasimhan

(57) ABSTRACT

An injection molding apparatus for manufacturing hollow objects, such as plastic e.g. multi-layered preforms, comprising an injection mold (1) with a front (2) and a rear side (3), which is composed of a clamp plate (4) on the front side (2), and a hot runner plate (5), where a manifold (6) is mounted in the hot runner plate, between which a set of injection nozzles (7) is arranged, which are each provided with a central supply duct (8), at the free end (9) whereof an injection gate (10) is provided. Said apparatus is remarkable in that said injection gate (10) is closable by means of a locking rod (11), which is movable herein to and fro through a profiled inner part (12) which is received in a holder (13) around which a heating element (14) is provided into which a primary channel (15) opens for supplying the plastic base material to the injection gate (10). Each injection nozzle (7) is directly removable individually from the injection side (16) of the injection mold at the injection side thereof, and a respective secondary channel (17) is provided separately; and method therefor.

17 Claims, 8 Drawing Sheets

(51) Int. Cl.
*B29C 45/27* (2006.01)
*B29C 45/28* (2006.01)

(58) Field of Classification Search
CPC .... B29C 2045/1609; B29C 2045/1612; B29C 2045/1614
See application file for complete search history.

(56) References Cited

U.S. PATENT DOCUMENTS

| | | | |
|---|---|---|---|
| 5,635,227 A * | 6/1997 | Whisenhunt | B29C 45/281 |
| | | | 264/328.9 |
| 5,935,615 A * | 8/1999 | Gellert | B29C 45/1603 |
| | | | 425/130 |
| 5,935,616 A * | 8/1999 | Gellert | B29C 45/1603 |
| | | | 425/130 |
| 6,074,191 A * | 6/2000 | Gellert | B29C 45/1607 |
| | | | 264/328.8 |
| 6,099,780 A * | 8/2000 | Gellert | B29C 45/1603 |
| | | | 264/255 |
| 6,162,043 A | 12/2000 | Gellert | |
| RE41,536 E * | 8/2010 | Hagelstein | B29C 45/27 |
| | | | 425/549 |
| 2001/0011415 A1 | 8/2001 | Kalemba | |
| 2005/0031728 A1 | 2/2005 | Babin | |
| 2005/0095313 A1 | 5/2005 | Ciccone | |
| 2007/0065537 A1* | 3/2007 | Ciccone | B29C 45/2806 |
| | | | 425/564 |
| 2007/0292557 A1 | 12/2007 | Dewar | |
| 2008/0152751 A1* | 6/2008 | Fairy | B29C 45/1603 |
| | | | 425/549 |
| 2008/0292746 A1 | 11/2008 | Olaru | |
| 2009/0142440 A1* | 6/2009 | Babin | B29C 45/2806 |
| | | | 425/564 |
| 2009/0155405 A1 | 6/2009 | Gunther | |

FOREIGN PATENT DOCUMENTS

| | | | |
|---|---|---|---|
| EP | 1386717 | * | 2/2004 |
| EP | 1386717 A1 | | 2/2004 |
| JP | 2002-361691 | * | 12/2002 |
| JP | 3160874 U | | 7/2010 |
| NL | 9201886 | * | 5/1994 |
| WO | 02070226 A1 | | 9/2002 |

* cited by examiner

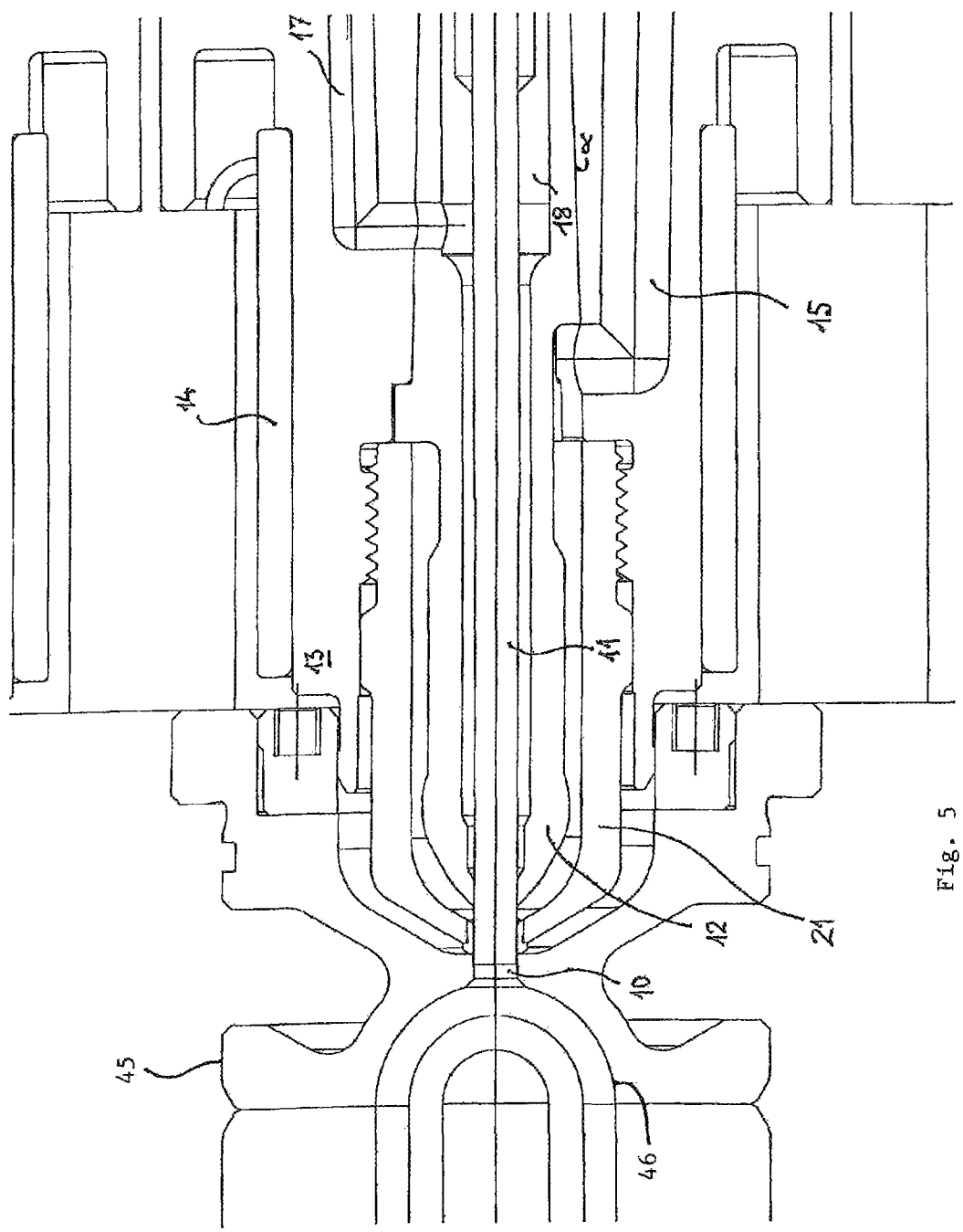

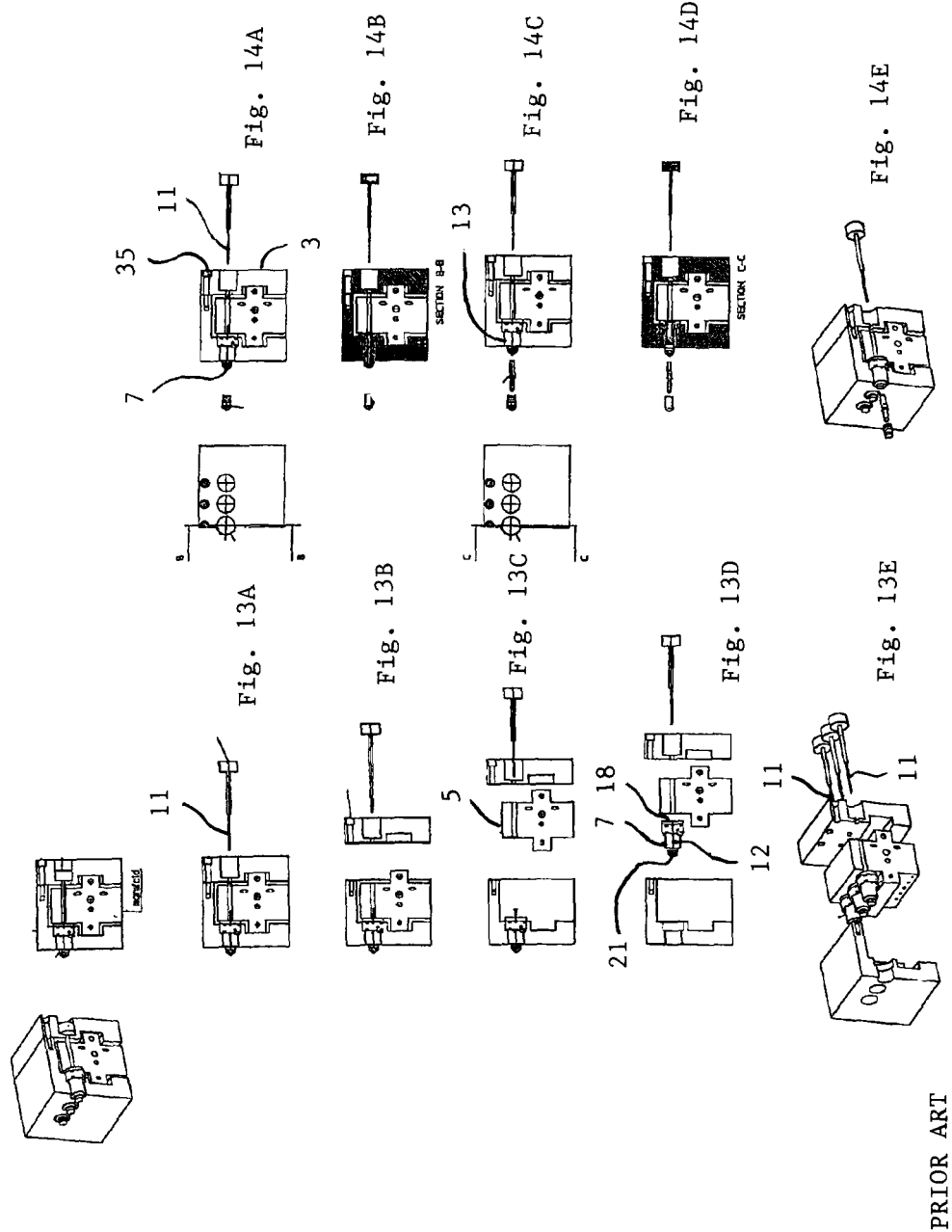

INJECTION MOLDING APPARATUS FOR MANUFACTURING HOLLOW OBJECTS, IN PARTICULAR PLASTIC PREFORMS, RESP. CONTAINERS AND METHOD THEREFOR

FIELD OF THE INVENTION

The present invention relates to an injection-moulding device for producing of hollow objects, in particular plastic preforms or semi-finished products intended to be processed further subsequently to produce end products of the plastic container type.

Devices of this type are known from EP-A-0686081 to which reference is specifically made. The so-called nozzle orifice forms a substantial part of this type of device.

BACKGROUND OF THE INVENTION

In a known production process, the plastic base material is forced under pressure to a pair of nozzle orifices provided in a mould block, via a network of supply ducts which are accommodated in a manifold in which they are heated by means of heating elements which are provided for this purpose in order to maintain the temperature of the supplied plastic material. From that point, the plastic material is injected in a mould, in which the abovementioned semi-finished products are produced by means of a series of successive operations, including metering and injecting the plastic material into the mould, pressing it down by means of the mould, cooling it and releasing it from the latter. During the injection phase, the liquid plastic material is injected into the mould between the core and cavity thereof. This also applies to end products such as a packaging container or closure of the lid type.

In known injection-moulding devices, the nozzle orifices are clamped between a so-called hot runner plate, in which the abovementioned network of supply ducts is accommodated and kept at the required temperature by means of a suitable heating means, and a cover plate. The free ends of the abovementioned nozzle orifices protrude therefrom so that the supplied plastic materials can be transferred to the mould.

The hot runner plate contains the manifold and the supply ducts which are heated therein and pushes against and closely adjoins the nozzle orifices. The operating temperature of the manifold and of the nozzle orifices is usually between 150° and 350° C., and in particular is approximately 300° C.

On the opposite side of the supply block, a clamping plate is fitted which covers the hot runner plate and in which the actuation of the abovementioned nozzle orifices takes place with effect at the location of their respective gates at their free end. The moulding on is controlled by means of reciprocating needles which block or clear said gates as a result of suitable actuation of the needles. In case an incident occurs at one of the various nozzle orifices of a multiple mould, the production of the mould has to be halted completely. This may be due to wear of an element in the flow path, soiling or narrowing of the flow ducts. In that case, the entire arrangement has to be dismantled, which is usually carried out from the rear side of the injection-moulding block. However, this creates a considerable problem as dismantling the injection-moulding device comprises the following steps. The clamping plate is unscrewed and removed, the manifold with all the flow ducts is detached and removed, the problematic nozzle orifice itself is eventually removed and replaced and subsequently everything has to be fitted back in reverse order. Thus, this replacement procedure for a single damaged nozzle orifice is relatively laborious, which is very disadvantageous. It is all the more disadvantageous since such devices comprise a large number of nozzle orifices.

In addition, the entire replacement procedure during this fitting has been found to carry a great risk of damage to the components, such as heating elements and temperature sensors which have been incorporated therein. In order to remedy this problem, these components are replaced as a preventive measure, but this in turn is associated with excessively high costs, which results in another problem.

However, the abovementioned problems of soiling and narrowing generally occur in the supply ducts which are not intended for the flow of a primary plastic base material, as these are neither dimensioned nor designed for this purpose. The supply ducts which are referred to here and which are the most problematic are however usually intended for more specific materials which may vary according to the application. Precisely because of this variability of application-specific secondary materials, it is virtually impossible to construct such flow ducts to exactly fit the materials which are to flow through them as these vary widely. Such circumstances may occur in the so-called multilayer technology which is used to produce multi-layered structures. These essentially consist of a primary base material which incorporates a secondary material in the form of a secondary layer contained in a primary base layer. However, this may also occur with a monolayer, such as PET/PET or PET, recycled PET or other materials. In such cases, a nozzle orifice which can be removed from the front has been in use for a long time.

With known multilayer systems, it is now impossible to no longer actuate the heating elements in order to switch off one or even more nozzle orifices during production, since this could cause cooling down of the system resulting in shrinkage, due to which the clamping of the nozzle orifices in the device, which are completely or partly made of metal, would no longer be optimum due to the metal composition, and neither would the connection between the manifold and the nozzle orifice. After all, all this would result in a leak at the location of the hot runner plate. This amounts to a leak of liquid plastic material at high temperature and pressure inside the device which would thus cause the cavities which have thus been created between said plates to be filled. The fatal consequence thereof would then be a total malfunction of the injection mould resulting in an undesired production shut-down. This situation has to be prevented at all costs, as the production process has to continue.

Thus, putting just one nozzle orifice of a multiple injection mould out of action is absolutely forbidden due to the construction of the latter. After all, since all nozzle orifices are directly connected to a communicating network of supply ducts through which the material stream is forced, one nozzle orifice directly affects the other in a mutual interaction. The immediate result thereof is that the entire system has to work in its entirety in order to be able to ensure that the semi-finished products which are to be produced are of good quality, in particular multilayer preforms or plastic containers.

PRIOR ART

U.S. 2009/155405 A1 does disclose an injection-moulding device in which the nozzle orifice is fitted on the front side, but the nozzle orifice is not provided with a needle valve.

Fitting needle valves in nozzle orifices is indeed customary in injection-moulding and U.S. 2005/031728 A1 discloses that nozzle orifice parts which are situated at the front can be readily replaced, both when fitting delivery ports and in the case of closing valves.

AIM OF THE INVENTION

It is an object of the present invention to provide a solution to the above identified problem considering the following problematic aspects which are successively discussed below, in particular with duct systems intended for supplying different materials, in particular having different properties, such as in the abovementioned multilayer technology.

Firstly, the dimensions of the entire plastic material supply system are geared to the originally determined primary plastic base material, such as polyethylene terephthalate. Other materials which are used for end products may also be considered, such as a packaging product comprising a box and lid made of PP-EVOH or another material consisting of 2 or 3 or even more components. In this case, pre-dried PET granules are processed to form semi-finished products in the above-described injection-moulding process. When other materials, namely secondary plastic materials, also have to be supplied via the same injection-moulding system, it is virtually impossible to use such presized dimensions of the respective supply circuits, in particular as such injection moulds also have to process a variety of secondary materials whose properties may vary greatly. Since secondary materials are usually used because of their specific function and the latter is to be imparted on the multi-layered structure, these materials are usually much more sensitive, resulting in a higher risk of burning due to the high operating temperatures. This local burning or soiling thus actually damages the supply system locally, which is already sufficient to jeopardize the operation of the entire system.

Moreover, there is the additional problem of leakage due to shrinkage of certain elements in the supply circuit, in particular if these are made of metal. This is due to the fact that cooling down takes place when a component in the circuit has to be repaired or replaced and the supply system therefore has to be switched off.

Furthermore, there is also the aspect of hypersensitivity of the secondary materials—which is possibly significantly greater than that of the primary material for which the supply ducts are designed—the aim being to increase the life of the so-called hot runner. Otherwise, the supply ducts will indeed be blocked due to clogging, while the supply ducts are in communication with one another in a supply network, so that the entire supply system is completely mutually balanced. A single and local problem thus inevitably has an effect on the operation of the entire system.

In addition, if the system has to be put out of action in order to enable cleaning of the supply ducts, this entails long waiting periods of at most 5 to 6 hours, during which the system is completely inoperative. Downstream, this has an effect on the quality of the semi-finished products or plastic containers, respectively, resulting in an unacceptable reject coefficient.

SUMMARY OF THE INVENTION

In order to solve the problem set out above, an injection-moulding device is proposed according to the present invention as defined in the attached claims, in particular an injection-moulding device with a so-called double nozzle for producing hollow objects, of the abovementioned type, in particular multi-layered plastic preforms, comprising an injection mould with a front and a rear side. It has a clamping plate on the rear side and a hot runner plate in which a manifold is fitted. In between these, a couple of nozzle orifices are fitted, each provided with a virtually centrally arranged supply duct. At the free end thereof, a gate is provided which can be locked by means of a locking bar which is movable therein. It can be moved to and fro in a profiled inner part which is accommodated in a holder around which a heating element is provided into which a primary duct opens for supplying the plastic base material to the gate. This device is characterized by the fact that each nozzle orifice is directly removable from the injection-moulding side of the injection mould on the injection side thereof and a separate secondary duct is provided. Thus, according to this remarkable main embodiment of the injection-moulding device with a multiple mould according to the invention, a separate secondary duct is in each case provided for each nozzle orifice.

Thanks to this proposed component deformed according to the invention, it is no longer necessary to dismantle the entire injection mould from its rear side in case of soiling or narrowing, in particular in the secondary, but also even in the primary supply ducts in the nozzle orifice. After all, it suffices to pull the needles with access thereto from the outside of the injection mould on the rear side thereof, to keep the temperature of the nozzle orifices and the manifold at production temperature and to dismantle the inner part thereof from the front side of the injection mould, including the needle guides. After all, this gives access to the inner part of the nozzle orifices and the needle guides which is where most problems occur, mainly when supplying secondary materials.

Dismantling is carried out by unscrewing the tip of the nozzle orifice from the outside, i.e. from the front side of the injection mould, and to remove the inner part, including the needle guide, from the holder of the nozzle orifice. Thus, thanks to the invention, it is possible to clean or replace, respectively, the soiled or damaged components without having to dismantle the entire injection mould from the rear side in the process. Since the latter is very laborious, this modified installation is a particularly notable advantage of the system according to the invention, thanks to which the system can continue to operate, even while a repair or replacement operation is taking place. This is crucial, since this means that the system does not have to be cooled during production and can remain at production temperature. As a result, shrinkage of the metal components of the supply circuit no longer occurs, thus virtually eliminating any risk of flow material leaking inside the injection mould. This makes the system highly reliable.

Furthermore, this invention is more advantageous the more complex or the larger the injection-moulding systems are. This is the case with a relatively large number of nozzle orifices which may be quite high, up to more than 128 and/or a denser network of supply ducts, since statistically, the potential failure of one single nozzle orifice in the entire injection-moulding system is then consequently relatively greater.

In an advantageous embodiment of the injection-moulding device according to the invention, the abovementioned inner part of the nozzle orifice is conically supported on and centred in the holder thereof, with a decreasing outer section in the upstream direction. The conical shape is advantageous during the dismantling procedure as, once it is detached, it can be more easily removed than would be the case with a cylindrical shape. It is also possible to achieve a perfect fit or seal without play, resulting in a plastics-sealed system. Finally, it is not necessary to resist a cylindrical shape during the fitting as the closure or fit is situated right at the end, where there is no risk of damage.

In a particularly advantageous embodiment of the injection-moulding device according to the invention, the needle guide in the nozzle orifice is composed of a ceramic material. The reason for this is that it offers the significant advantage that it is completely inert to aggressive or corrosive flow materials. Also, it is better able to withstand potential wear caused by the frequent reciprocating movements of the needle in the guide.

Due to the fact that the secondary material usually severely damages the components of the nozzle orifice and the needles, depending on their type which depends on the desired application of the specific secondary material, a very small tolerance is furthermore applied to the dimensions of the proposed needle guide made of ceramic material. In addition, this offers the advantage that it is very hard. Due to the characteristic use of this specific material in a generally metal construction, the productivity of the entire process is significantly improved.

However, it should be understood that if soiling or narrowing of the ducts in the holder of the nozzle orifice occurs—i.e. more often in the upstream direction thereof—it may be possible. that the entire injection mould still has to be dismantled from the rear side thereof. However, most problems will sooner occur in the inner part of the nozzle orifice than in the ducts of the holder, so that this aspect is rather incidental compared to the former. Thanks to the invention, it is possible to postpone complete dismantling several times, thus still increasing the life of the injection mould compared to a classical systematic dismantling from the rear side.

The present invention furthermore also relates to a method for injection-moulding semi-finished products or also end products, which is remarkable in that each said injection nozzle is removed from the injection side of the injection mould on the injection side thereof, with the needles being pulled with an entrance from the outside of the mould, the temperature of the nozzle orifices and the manifold being kept at production temperature and the inner part including needle guide is removed from the front side, said removal taking place by unscrewing the tip and removing the inner part with needle guide from the holder by means of a removal aid.

Further features and properties are defined further in the appended sub-claims. Thus, inter alia, with regard to the variability of the selected secondary materials which are supplied via the respective secondary ducts. Oxygen is undesirable in packaging of quite a number of foodstuffs, as oxygen is responsible for oxidation of food constituents, resulting in the quality of the foodstuffs deteriorating and, in addition, contributes to the growth of fungi and aerobic bacteria. The detrimental effects of $O_2$ on beverages such as fruit juice and beer, generally relate to nutritional value, colour and aroma (smell and taste).

The realization that residual oxygen in packaging has detrimental effects has resulted in a large number of technologies aimed at reducing the oxygen content and/or removing the oxygen, including the development of oxygen scavengers (OS). Likewise, when packaging beverages which are susceptible to oxidation, such as fruit juices and beers, oxygen is to be excluded as much as possible in order to maintain the flavour and freshness. Glass bottles are increasingly being replaced by plastic bottles, such as PET bottles. However, polyethylene terephthalate is relatively permeable to oxygen and, without additional modifications or treatments, is thus not suitable for packaging beverages which are susceptible to oxidation. For this reason, multilayer PET bottles are often used, in which an intermediate layer which is made from a specific secondary material and forms an active or passive barrier to oxygen is provided between two PET layers. A chemical oxygen scavenger is often used as an active barrier in the secondary intermediate layer. However, these have a number of significant drawbacks: after some time, the oxygen-consuming reaction stops, the multilayer system results in a bottle of reduced transparency and the various layers of the multilayer can become detached leading to delamination. In some cases, there may also be problems with regard to recyclability due to the chemical contamination of PET. By contrast, biological oxygen scavengers which are based on the use of micro-organisms trapped in the polymer matrix, have significant advantages compared to chemical scavengers. The production cycle of such biological oxygen scavenger material comprises incorporating the micro-organisms in a suitable polymer matrix (the production of the film or preform), storing the film or preform without loss of viability of the micro-organisms (storage and distribution) and reactivating them when the film or preform is being used (e.g. via contact with moisture during bottling of beverages).

Both chemical and biological scavengers have drawbacks and advantages, which clearly shows the importance of the use of varying secondary materials which the present invention makes possible, in particular with the device presented here. After all, until now, it was mainly these secondary materials which damaged the supply circuits and caused other problems of the kind as described above, due to their varied and application-specific particular characteristics.

It is intended to overcome the abovementioned drawbacks as effectively as possible by using a biological oxygen scavenger and thus to introduce the following advantages and properties, including safety and non-toxicity, since only harmless micro-organisms are used. The use of natural micro-organisms, rather than chemical compounds as the raw material for a packaging material is an attempt to alleviate fears among consumers regarding the use of chemical compounds and is a response to the demand for durable biological alternatives. The use of packaging materials based on renewable sources is a new trend in the field of packaging research. In contrast to the chemical scavengers, biological scavengers do not stop working or become exhausted. After all, it is one of the aims to introduce the micro-organisms into the bottles in a state in which they continuously consume oxygen. By using a PET-based bio-aggregate, it is expected that the problems associated with a multilayer design, such as haze and delamination, will be redundant. The adhesion between the outer layers and the intermediate layer is perfect, since it is made of one and the same material. Recyclability would also be less of an issue, as the incorporated micro-organisms will not survive the recycling process. The cost price of a biological scavenger may be limited and is at least less expensive than the price of a chemical scavenger. The use of biological oxygen scavengers must allow for the use of various additives, such as AA blockers, colourants, UV blockers, etc., which is not possible with chemical scavengers. For this reason, micro-organisms are incorporated in a polymer matrix.

An alternative approach is thus the use of aerobic micro-organisms as active oxygen scavenger components. Incorporating such biological oxygen scavengers in a PET matrix is completely in line with the current trend for the development of durable packaging materials. In order to incorporate micro-organisms in a PET matrix, these organisms have to be able to withstand high temperatures which occur during the melting of the PET granules and requires a modified injection-moulding process for the PET preform.

Resting states of extremophile micro-organisms are able to withstand very high temperatures of >100° up to 270° C. and may be taken into consideration. These may be coated on PET granules to form a biopolymer ('bioPET'). This biopolymer can then be incorporated into the multilayer PET structure during the injection-moulding process of the PET preform by co-injection as an intermediate layer. However, in order for the biological intermediate layer to be able to function as an active oxygen barrier, the incorporated spores have to be transferred from their sleeping state into a state of metabolic activity during or after production.

In order to be able to incorporate micro-organisms in a PET matrix, these organisms have to be able to withstand the high temperatures (typically melt at 260° C.) which occur during melting of the PET granules and/or a modified injection-moulding process for the PET preform at reduced temperature. This has resulted in the production of a bioPET complex with the realisation of an absolute oxygen barrier. This was possible on the basis of acceptable extremophile micro-organisms. These organisms may be both eukaryotic (such as yeasts and the like) and prokaryotic (such as bacteria). However, yeasts are not very thermoresistant and therefore less suitable in this case.

In the case of prokaryotes, the resting states (spores) of extremophile bacteria are in particular taken into consideration due to their increased resistance to heat. Micro-organisms which are able to resist the abovementioned high temperatures are already available. It has already been possible to isolate a suitable species of the *Bacillus subtilis* complex from a desert fruit.

Further details and particulars are described in more detail in the following description of an illustrative embodiment of the invention which is explained with reference to the attached drawings, in which identical reference numerals refer to the same or similar elements.

BRIEF DESCRIPTION OF THE DRAWINGS

FIG. 5 shows a partial side view in cross section, viewed from the injection-moulding device illustrated in FIG. 3, but in the operative state.

FIG. 6 shows an enlarged view in cross section, viewed from one of the nozzle orifices illustrated in the previous figure.

FIG. 7 is a side view of the part of the device according to the invention which is illustrated in FIG. 4.

FIG. 8 shows a front view of the abovementioned part as illustrated in FIG. 5 according to the invention.

FIG. 9 shows a further view of the abovementioned main part of the device according to the invention, with separated parts.

FIGS. 13A-13E show the dismantling of a conventional device.

Figures row 14A-14E diagrammatically show arrangements of the device according to the present invention, in successive stages of dismantling of one of the nozzle orifices with a complete comparative dismantling procedure between known and innovative situations in detail by means of the figures row 13A-13E compared to figures row 14A-14E, respectively.

Figure 15:
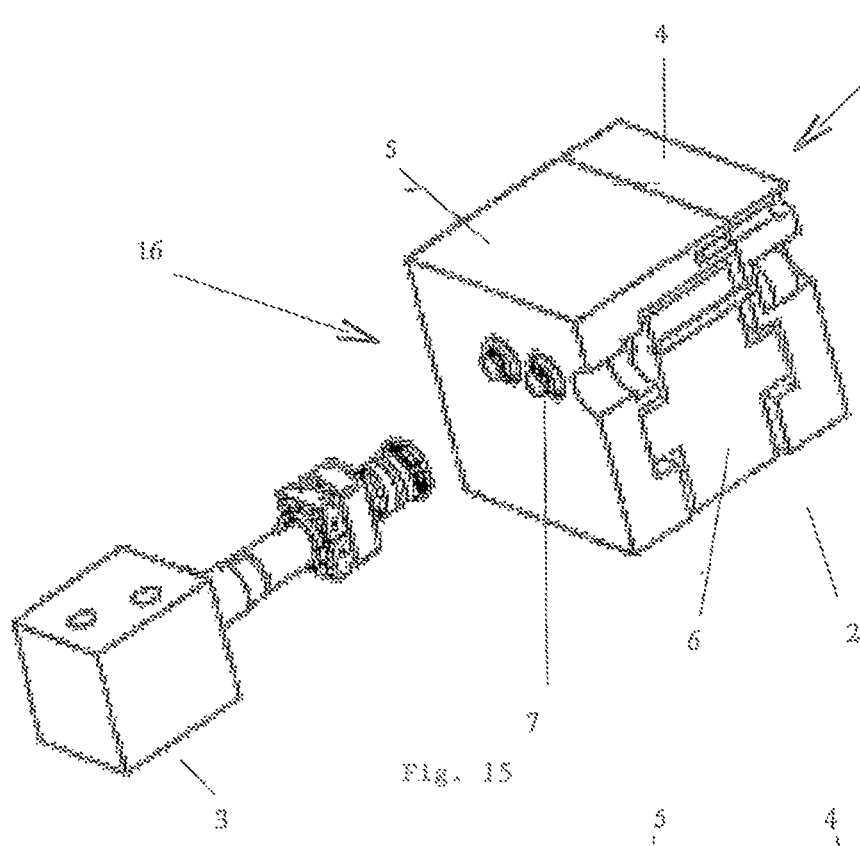
Figures 16, 17:
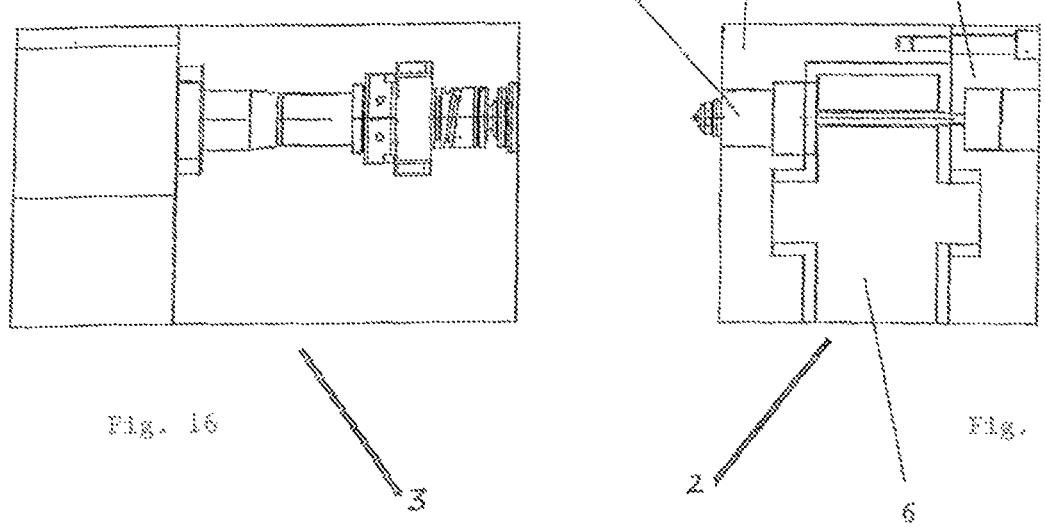

FIGS. 15 to 17 show a number of enlarged views, derived from some subfigures from the abovementioned rows 12 and 13, respectively.

DESCRIPTION

In general, the present invention relates to an injection-moulding device for producing hollow plastic objects, in particular multi-layered preforms and containers.

Figure 1:
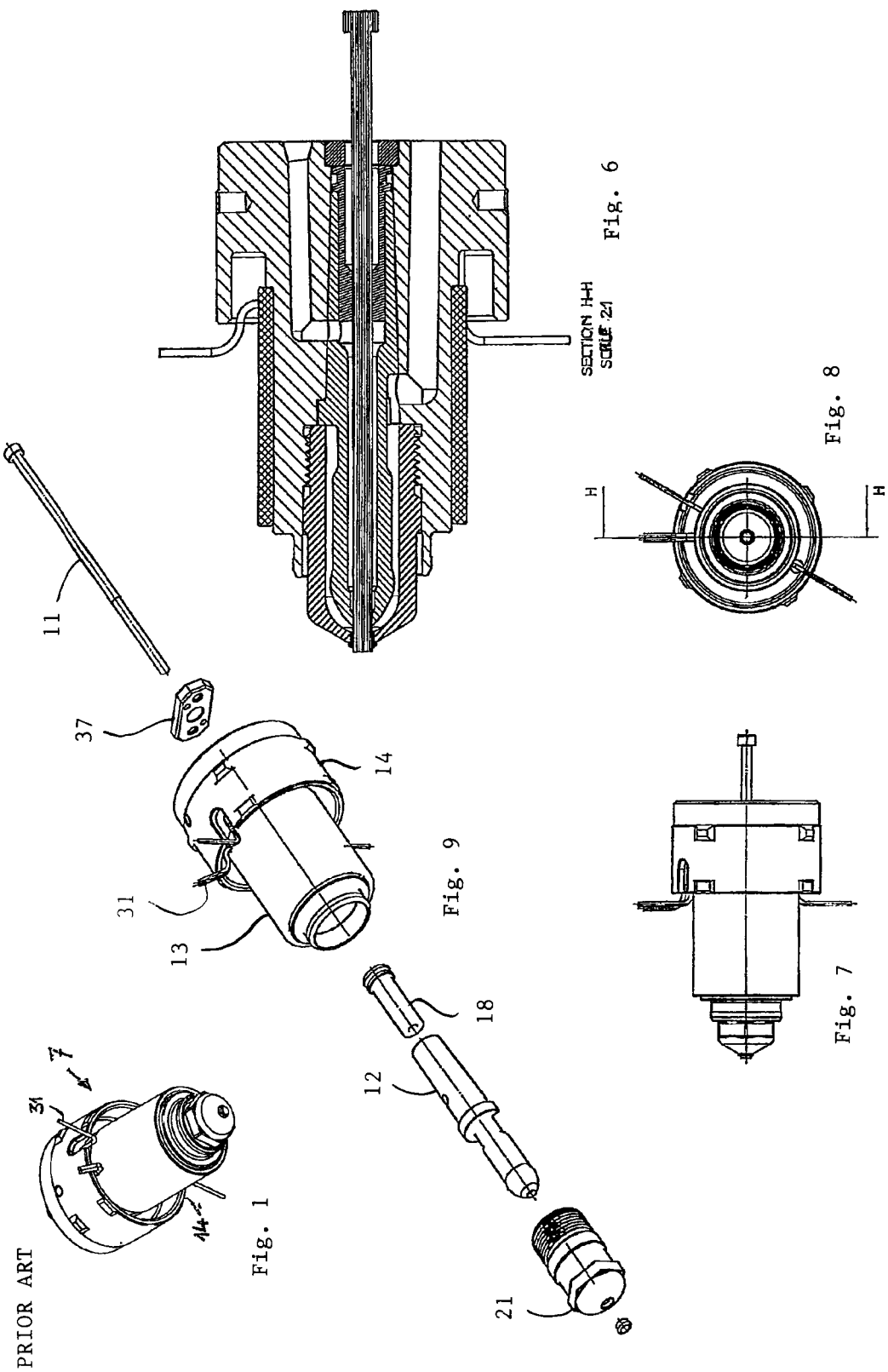
FIG. 1 is a perspective view of a conventional nozzle orifice or so-called multilayer nozzle which is accommodated in a conventional injection-moulding device.
Figure 2:
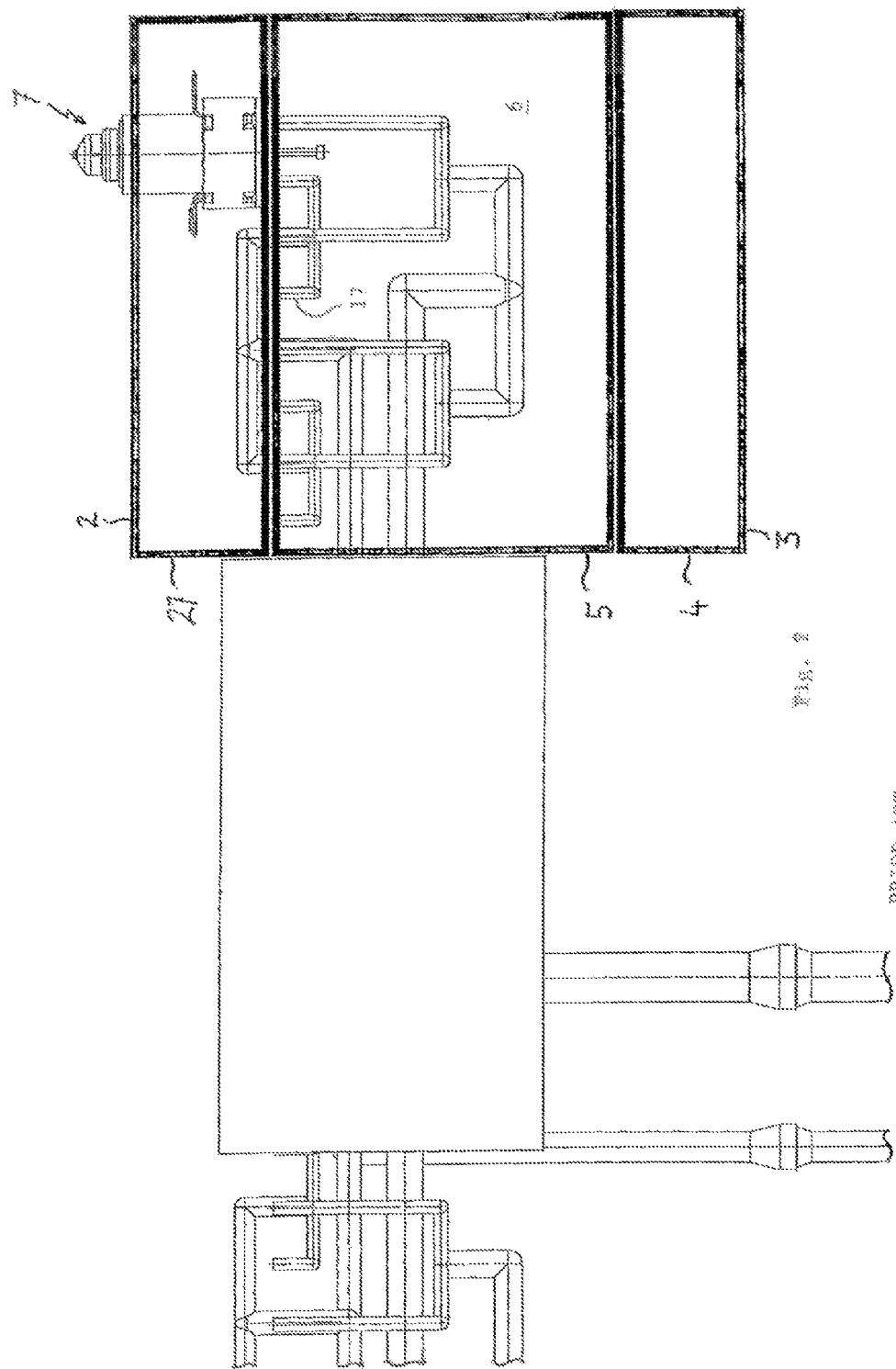
FIG. 2 shows a block diagram of a conventional device for injection-moulding plastic preforms with its diagrammatically illustrated main components.

FIG. 1 shows a conventional nozzle orifice 7 which is accommodated in a conventional injection-moulding device, intended for injection-moulding plastic preforms, which is shown in its diagrammatically illustrated main components in FIG. 2, in which the multilayer nozzle or nozzle orifice is clamped between a hot runner plate 5 and a cover plate. The conventional nozzle orifice illustrated in FIG. 1 has a temperature sensor 31 and a peripheral heating element 14.

The injection-moulding device illustrated in FIG. 2 in block-diagrammatical form shows the following constituent parts, i.e. a hot runner plate 5 and a cover plate 27 between which a single illustrated nozzle orifice 7 is clamped and, on the rear side, a clamping plate 4 in which the manifold with heated supply ducts is accommodated in the hot runner plate.

The hot runner plate 5 contains the manifold 6 with heated ducts which closely adjoins the nozzle orifice 7. The operating temperature of the manifold 6 and of the nozzle orifices 7 is approximately 300° C.

The clamping plate 4 covers the hot runner plate 5 and also contains the actuating system for the needles which open and close gate 10.

If a problem occurs at one of the numerous nozzle orifices 7 of a multiple mould, such as wear, soiling or narrowing of the flow ducts, the production of the mould has to be stopped and the entire arrangement has to be dismantled from the rear side 3.

Soiling and narrowing usually occur in the duct for secondary material 17. Dismantling comprises unscrewing and removing the clamping plate 4, releasing and removing the manifold 6 with the flow ducts, the removing and replacing the defect nozzle orifice 7 and the fitting everything back in reverse order.

While dismantling and fitting back are taking place, it is very dangerous if parts such as heating elements 14 and temperature sensors 31 are damaged, and therefore these parts are replaced as a preventative measure. However, this results in very high costs.

With this multilayer system, it is impossible to switch off one or more nozzle orifices 7 during production by no longer actuating the heating element 14 because the clamp of the nozzle orifice 7, i.e. the connection between the manifold 6 and the nozzle orifice 7, is no longer optimal. After all, this may result in a hot runner leak, leading to leaked plastic filling the free cavities between said plates at high temperature and pressure, which would result in a total malfunction of the mould and thus to a production stop. Closing off a nozzle orifice 7 on a multiple mould is certainly not an option as the one nozzle orifice 7 influences the other through the material stream in the primary and secondary ducts 15, 17, and therefore the entire system has to work in order to ensure that the products are of good quality.

Figure 3:
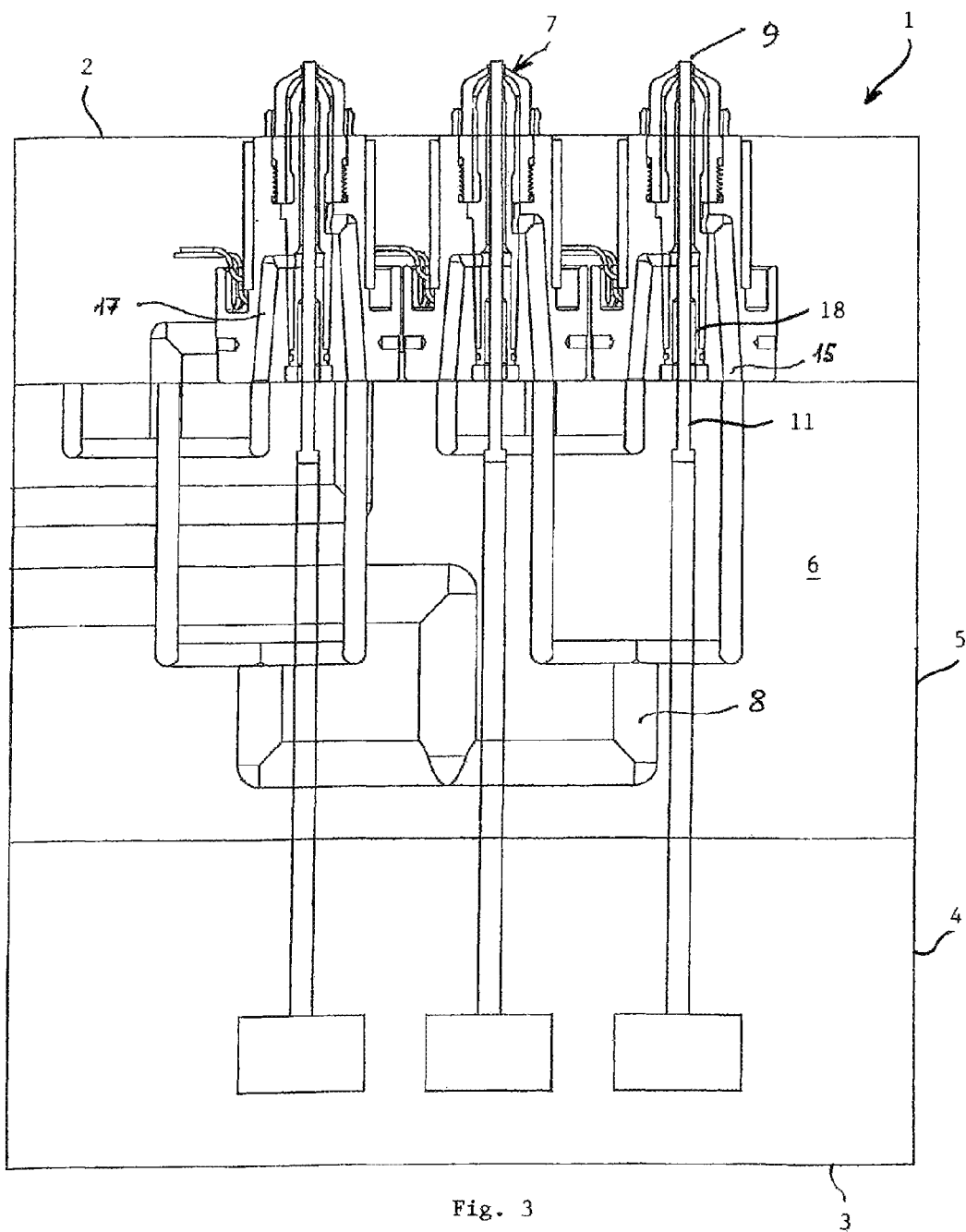
FIG. 3 shows a side view of a part of an injection-moulding device according to the invention.
Figure 4:
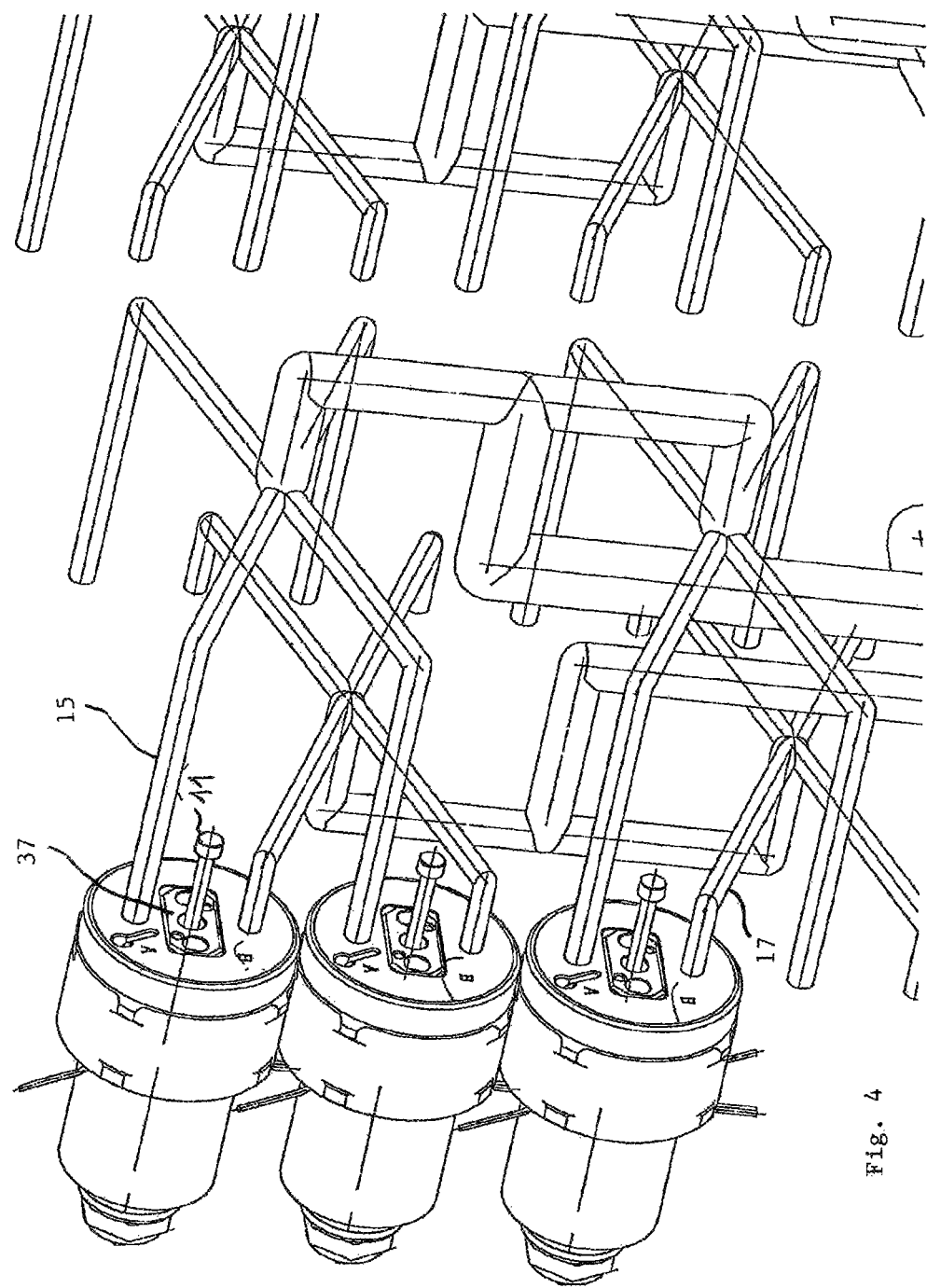
FIG. 4 is a partial rear view in perspective, viewed from the injection-moulding device illustrated in the previous figure.
Figure 10:
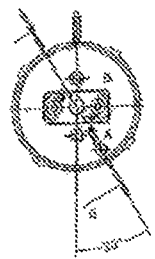
FIG. 10 shows a rear view of the abovementioned part according to the invention illustrated in FIGS. 7 and 8, respectively.
Figure 11:
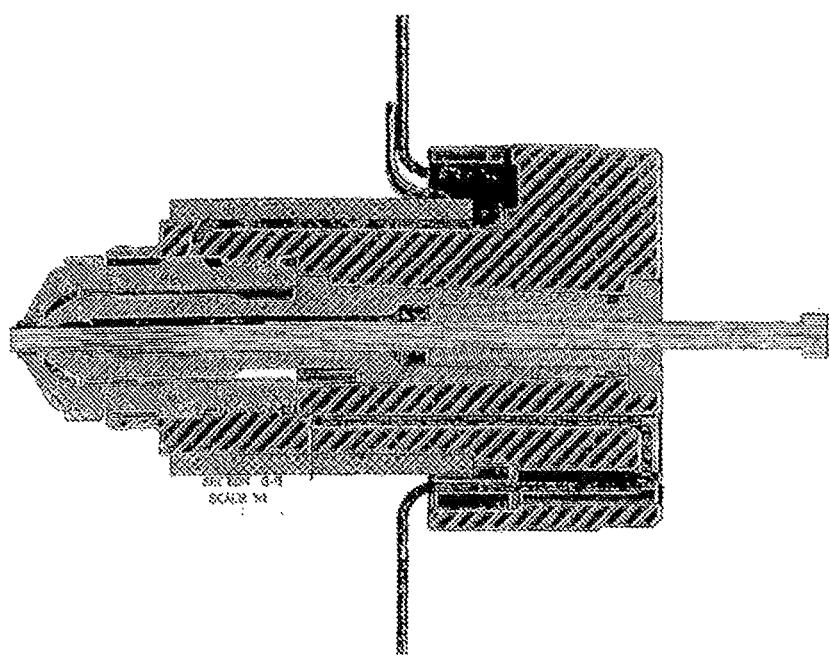
FIG. 11 shows a further functional view of the part according to the invention as illustrated in FIG. 6, including an additional operating detail.

FIGS. 3 and 4 show a part of the injection-moulding device with three nozzle orifices 7 which are shown in the fitted position on the front side of the injection mould. The operative needles 11 are suitably actuated. This shows the system in which not necessarily the entire mould has to be dismantled from the rear side 3 if soiling or narrowing of the primary or secondary ducts 15, 17 occurs. It suffices to pull the needles 11 with access from the outer side of the mould, to maintain the temperature of the nozzle orifices 7 and the manifold at production temperature and to dismantle the inner part including needle guide 18 from the front side 2.

For the sake of clarity, only a limited number of nozzle orifices 7 are shown in FIG. 3, in particular only 3 of 64 or even 128 or more which the injection-moulding device may comprise. The network of supply ducts contains a primary supply duct 15 and a separately arranged secondary supply duct 17, both of which end in the nozzle orifice 7, in virtually centrally fitted supply duct 8. At the free end 9 thereof, a gate 10 is provided which can be closed off by means of a locking bar 11 which can be moved therein or needle.

FIG. 4 clearly shows how the supply of primary plastic base material, such as PET for example, is separate from that of secondary material, such as PA for example. This separate supply is particularly appropriate in view of the specific functionality of the secondary material compared to the primary base material which may, in addition, vary widely. A possible function of the secondary supply material is, for example, a barrier function. In said FIG. 4, the relatively complex network of supply ducts can still be seen and is viewed from a different angle. In view of the continuous communication between the various parts thereof, a permanent equilibrium has to be ensured in this duct system in order to guarantee a good operation of the entire injection-moulding device.

The above is shown in enlarged and detailed view in FIG. 5.

Furthermore, a fragment of the mould is also represented, the cavity of which is intended to produce a so-called preform under action of the injection-moulding device. Due to the incorporation of a separately provided secondary duct 17, a preform with barrier can be incorporated in the primary base material which is injected via the gate 10 by the primary supply duct 15.

A suitable temperature in the nozzle orifice 7 is ensured by the peripheral heating elements 14 having a substantially cylindrical cross section. This is also visible in the sectional view from FIG. 6 which also shows the holder 13 which is arranged inside the heating element 14 which incorporates a profiled inner part 12. Preferably, this has a conical profile and is conically supported and centrally arranged in the holder 13.

Furthermore, a cover disc 37 is provided on the inlet side of the nozzle orifice 7 which positions the needle 11 centrally on the inlet side thereof, while this needle 11 is axially displaceable to and fro inside the needle guide 18 which is provided for this purpose. Advantageously, the needle guide 18 is made from a ceramic material.

Figure 12:
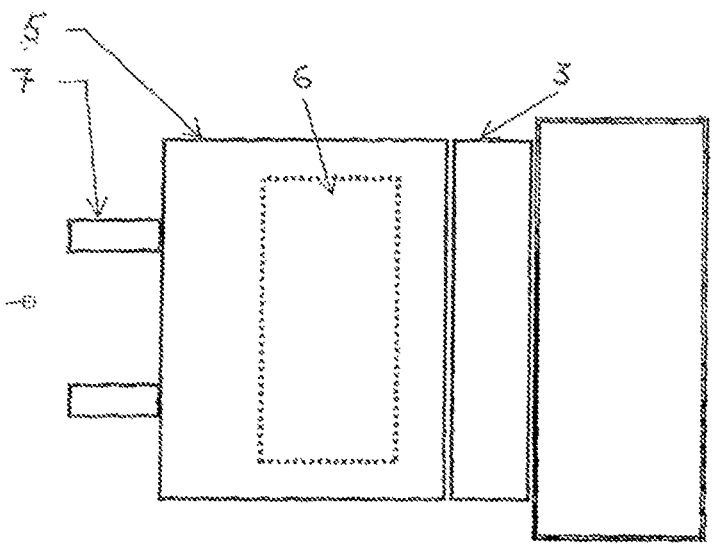
FIG. 12 shows a block-diagrammatic arrangement of the device according to the invention.

FIG. 12 shows a block diagram of the device for injection-moulding plastic preforms, illustrated in its diagrammatically illustrated main components, with double nozzle orifice 7 in which the multilayer nozzle or nozzle orifice is clamped on the hot runner plate 5. Thus, FIG. 12 is a diagrammatic illustration in the form of a block diagram which illustrates the practical and improved accessibility according to the invention when the injection mould has been installed on the machine or device. In this case, two nozzle orifices 7 on the hot runner plate 5 have been shown for clarity, with the cover plate on the opposite rear side and furthermore the machine plate.

The various process steps are illustrated in the row of FIGS. 14A-14E and compared to the known method according to the row of FIGS. 13A-13E. FIG. 14+, which consists of a number of subfigures 14A-14E which illustrate each step of the fitting/dismantling process, shows a view of the fitting and dismantling process with dismantled single nozzle orifice 7. In the top subfigure 14A thereof, the dismantling is shown of one single needle 11 from the machine, possibly with unscrewing of torpedo 35 after removal of the needle 11.

The following subfigure 14B shows a cross section thereof along line B-B.

The further subfigure 14C shows the dismantling of the inner part, if desired using a dismantling aid (not shown). In the following subfigure 14D, a cross section C-C thereof is shown. The last subfigure of the row of FIGS. 14+ shows a perspective view of a dismantled single nozzle orifice. In a comparative illustration, the latter row of FIGS. 14A-14E according to the invention is shown with the known conventional fitting process in the adjacent row of FIGS. 13A-13E. It can clearly be seen how laborious the dismantling procedure in the known state is, since the first subfigure 13A thereof illustrates the fitted state which shows a screw fastening of the cover plate with hot runner plate.

Due to the fact that the secondary material is very harmful to the parts of the nozzle orifice 7 and the needles, the needle guide 18 is made from a ceramic material and inserted with very small tolerances with regard to dimensions. The ceramic material is very hard and inert. Due to the use of this material, the productivity is increased with this ceramic needle guide.

In summary, as shown in FIGS. 3, 4, 5, 9, and 15, the invention relates to an injection-moulding device for producing hollow objects, in particular plastic preforms, more particularly multi-layered preforms, comprising an injection mould 1 having a front 2 and a rear side 3 which is composed of a clamping plate 4 on the rear side 3, and a hot runner plate 5, in which hot runner plate a manifold 6 is fitted between which a pair of nozzle orifices 7 is accommodated, each of which is provided with virtually centrally arranged supply duct 8, at the free end 9 of which a gate 10 is provided. This is characterized by the fact that said gate 10 can be closed off by means of a displaceable locking bar 11 which can be moved to and fro inside a profiled inner part 12 which is accommodated in a holder 13 around which a heating element 14 is provided into which at least one primary duct 15 debouches for the supply of the plastic base material to the gate 10, that each abovementioned nozzle orifice 7 is directly and separately removable from the injection-moulding side 16 (FIG. 15) of the injection mould on the injection side thereof and that a secondary duct 17 is in each case provided separately.

As shown in FIG. 5, secondary duct 17 is connected to common injection nozzle 7 which directly leads to a forming die 45 for manufacture of the preform 46, resp. container, in the injection point 10, thereof.

The invention claimed is:

1. Injection molding apparatus for manufacturing multi-layered hollow plastic preforms, comprising an injection mold (1) with a front (2) and a rear side (3), which is composed of a clamping plate (4) on the rear side (3), and a hot runner plate (5), where in the hot runner plate a manifold (6) is mounted, between which a set of injection molding nozzles (7) is arranged, which are each provided with a substantially centrally arranged supply duct (8), at the free end (9) whereof an injection gate (10) is provided, wherein each said injection nozzle (7) is directly removable individually from the injection side (16) on the front side (2) of the injection mold at the injection side thereof, wherein each said injection nozzle comprises a profiled inner part removable from the injection side (16) on the front side (2), wherein said injection gate (10) is closable by a locking rod (11) movable therein to and fro through the profiled inner part (12) which is received in a holder (13) around which a heating element (14) is provided into which at least one primary duct (15) passes through for supplying primary plastic base material to the injection gate (10) for forming a primary layer, wherein a respective secondary duct (17) is provided separately,
   wherein each said injection nozzle comprises an inner channel and an outer channel around the inner channel, wherein the inner channel is within the profiled inner part (12) and the outer channel is around the profiled inner part in the nozzle, and
   wherein said inner part (12) is supported substantially centered in the holder (13) of the injection molding nozzle (7) thereof, and wherein said profiled inner part (12) has a conical end with a decreasing annular slope extending from a downstream to an upstream direction of flow of the plastic base material, and
   wherein the primary duct (15) supplies material to the outer channel and the secondary duct (17) supplies material to the inner channel proximal the conical end.

2. Injection molding apparatus according to claim 1, wherein inner sides of said inner part (12) of the injection nozzle (7) have a uniform annular profile with a substantially constant slope (a) towards a space in the upstream direction of flow in the injection nozzle, wherein the slope (a) is less than 30°.

3. Injection molding apparatus according to claim 1, wherein said inner part (12) encompasses a plastic sealed closed system with a close fit substantially without tolerance.

4. Injection molding apparatus according to claim 1, wherein said inner part (12) includes a needle guide (18) in which the needle (11) is movable back and forth individually by being guided therein, wherein said needle guide (18) is composed of a ceramic material, wherein a very tight tolerance is provided on the dimensions of the proposed needle guide (18).

5. Injection molding apparatus according to claim 1, wherein the injection mould has 64 to 128 or more injection nozzles (7) all of which are mutually arranged substantially in parallel to the injection side (16) thereof.

6. Method for producing of multi-layered articles via injection molding plastic preforms, respectively containers, by an injection molding apparatus according to claim 1, wherein each injection nozzle (7) is removed from the injection side (16) on the front side (2) of the injection mold (1) at the injection side thereof, wherein the needles locking rods (11) are actuated by being pulled with an access from the outside (19) from a rear side of the mold.

7. Method according to claim 6, wherein during operation the temperatures of the injection nozzles (7) and the manifold (6) are kept at production temperature being substantially constant except with small fluctuations almost negligible, and wherein when not in operation the inner part (12) in the injection nozzles including the needle guide (18) is dismountable from the front (2).

8. Method according to claim 7, wherein the disassembly is carried out by unscrewing a tip (21) and by dismounting the inner part (12) with needle guide (18) from the holder (13).

9. Method according to claim 7, wherein during the disassembly process of the inner part (12), if contamination or narrowing of the primary or secondary ducts (15, 17) occurs herein, the mold is not disassembled from the rear side (3), and only through the front (2) thereof and/or in that parts of the nozzles are cleaned or replaced without disassembling the entire mold from the rear side (3), but only from the front (2) thereof.

10. Method according to claim 6, further comprising forming the multilayered articles by supplying a secondary material to the injection nozzle (7) via the secondary duct (17), wherein the secondary material is selected from the group consisting of a fluid, semi-fluid or viscous material, forming a secondary layer of the multilayered articles in an intermediate phase selected from the group consisting of pastes, adhesives and other substances that possess a liquid phase under normal conditions of pressure and temperature, and that turn into a solid phase by curing, wherein said secondary material can be evenly applied with fairly low amounts of secondary material with formation of a multi-layer structure comprising primary layers, which is composed of a primary plastics material, and the secondary layer between the primary layers, wherein said secondary layer is provided as an interlayer and as a barrier layer, and wherein said secondary material is selected from the group consisting of chemical oxygen scavenger material and/or biological oxygen scavenger material.

11. Method according to claim 10, further comprising adding a predetermined amount of additives preliminarily to at least one of the aforementioned materials prior to the curing, wherein said additives are added with a neutralizing effect on undesirable external influences, wherein said additives are dyes with a neutralizing effect on the external influences and/or substances which have an adverse effect on a product to be contained within the multilayered articles, on an undesirable gas formation originating from a degradation of said product.

12. Method according to claim 10, wherein said secondary material is selected from organic scavengers from biopolymer aggregates which are composed of organisms of cells and/or cell products incorporated in a polymer, wherein a new function of the thus formed polymer product is achieved, wherein one operates below the operating temperature plate working temperature that is taken from the interval whose lower limit is determined at substantially 100° C., substantially under normal pressure conditions, at substantially 1 atmosphere.

13. Method according to claim 12, wherein said cells are selected from the category of cysts, and/or in the phase of the non-active or dormant states.

14. Method according to claim 12, wherein the cells are selected from prokaryotes, bacteria, duration stages or spores of extremophile bacteria, eukaryotes, yeasts, protists, fungi, and combinations thereof.

15. Method according to claim 12, wherein said organisms are selected among the category of the aerobic microorganisms or in that said cell products are selected among the category of the so-called metabolites, being the molecules that are synthesized by organisms by biochemical pathway.

16. Method according to claim 6, wherein the plastics are selected among the family of polyolefins among the family of polyethylenes or among the family of polypropylenes, or among the family of polyesters and polyethylene terephthalates.

17. Method according to claim 10, wherein manufacturing a multi-layered preform in an injection mold by injection molding, wherein a predetermined amount of the primary plastics material (PM) is injected in a hollow mold space under relatively high pressure p and temperature T, further wherein a predetermined amount of the secondary material (SM) is supplied into the hollow mold space under conditions of pressure and temperature which are lower than said primary injection pressure p and temperature T, wherein the secondary feed channel (17) is connected to the central supply duct (8) in a common injection nozzle (7) which directly leads to a forming die (45) for the manufacture of a preform (46) in the injection point (10) thereof.

* * * * *